Oct. 29, 1929.  E. MERZINGER  1,733,691
PRESS STUD
Filed Dec. 5, 1927
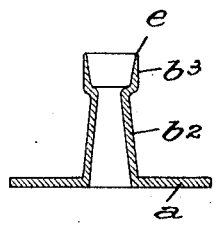

Patented Oct. 29, 1929

1,733,691

UNITED STATES PATENT OFFICE

EDUARD MERZINGER, OF DRESDEN, GERMANY

PRESS STUD

Application filed December 5, 1927, Serial No. 237,973, and in Germany December 16, 1926.

This invention relates to the hollow rivets for securing press stud members to the material to which they are to be attached, said rivets having a base plate and being forced through the material into a hollow ball member of the press stud member, likewise having a base plate, the end of the rivet which is introduced into the said ball member being compressed by the axially exerted pressure and spreading laterally so as to bear against the internal surface of the hollow ball. By this means the material is clamped between the base plates of the press stud member and the hollow rivet, the shank end of which is in locking engagement with the hollow ball member.

Experience has shown that in such fastenings the end of the rivet which is passed into the hollow ball member is frequently compressed to ensure a firm connection of the rivet shank to the press stud member. In some cases the shank portion of the rivet which is passed through the material becomes deformed instead of the end in the hollow ball member, so that no spreading of the end takes place at all. Moreover, when the rivet shank is formed by drawing it in the press out of the material of the base plate, the material of the shank becomes hardened thereby causing the end to offer considerable resistance to the axial pressure exerted on it after it has been inserted into the hollow ball member. Thus it becomes necessary to soften the end of the rivet by reheating it, in which case it is not possible to prevent the entire rivet shank, including the portion immediately surrounded by the material, from becoming soft, though that portion is not intended to become deformed.

It has been proposed in the case of rivets having the end of the shank which is passed into the hollow ball member closed, or beaded over to form a partly closed rounded end, to constrict or notch the shank below the end, so as to promote the upsetting or spreading of the end of the shank in the hollow ball member. It has been found, however, that the object in view cannot be completely attained in this way.

The present invention has for its object to remove the drawbacks and with this object in view the invention consists in a hollow rivet for securing press button stud members of the kind described, comprising a tubular shank having a base at one end, said shank being open at the other end and the material of the shank being thinner at this open end than at the other portions of the shank.

A constructional form of the drawing is illustrated by way of example in the accompanying drawing.

Referring to the drawing the part $b^3$ of the shank, located above the part $b^2$ that passes through the material, is widened at the top by being forcibly opened out. The wall of this part is thereby made thinner. In consequence of the weakening of the wall of the part of the rivet which enters the hollow ball member of the press button stud, it has been found by experience that it is easy to shape it by longitudinal compression in such a way that it bears in actual practice to an ample extent against the internal surface of the ball member of the press button stud and thus brings about a reliable rivet closure.

With this rivet it is not necessary to reheat the rivet shank. The shank $b^2$, which has become hard during the drawing, is maintained in its full strength, so that there is no fear of this part being affected by the longitudinal pressure. The upper, subsequently widened part of the shank becomes, however, more suitable for the crushing operation owing to the weakening of its margin, so that this part readily follows the guidance which the internal surface of the hollow ball member gives during the longitudinal compression.

It should also be observed that in the widening, which is preferably effected with a slightly conical mandril, a correspondingly conical cross section is imparted to the widened part $b^3$, in relation to the wall, so that the edge $e$ becomes quite sharp. Owing to this, however, the forcing of the rivet through the material is facilitated. On the other hand there is no risk of the sharp edge $e$ damaging the ball member at all owing to the rivet forcing its way through the wall of the ball member instead of being compressed. This disadvantage was frequently experienced when employing open ended hollow rivets of the known kind having the material of the shank of the same thickness throughout. These rivets were hard, whereas the ball member consists of softer material, so that frequently instead of the rivet pin being pressed into the desired shape it destroys or deforms the ball member. The weakened edge of the widened part $b^3$ of the hollow rivet pin according to the present invention, however, ensures the occurrence of the cup-like spreading of the shank and, which, notwithstanding the sharp edge $e$, results in the top of the rivet shank filling up the interior of the hollow ball member.

What I claim is:—

A hollow rivet for securing press button stud members of the kind described, comprising a tubular shank having a base at one end, said shank being tapered towards and open at the other end, the said tapered end being offset outwardly to form a shoulder and a hollow head and the material being tapered from the shoulder to the outer edge of the head to facilitate the bending and closing of the head when pressure is applied.

In testimony whereof I have signed my name to this specification.

EDUARD MERZINGER.